United States Patent
Kay et al.

(10) Patent No.: US 6,769,276 B1
(45) Date of Patent: Aug. 3, 2004

(54) INTERNAL ADJUSTABLE MOLD APPARATUS FOR SHAPING THE END OF A FIBER PREFORM TUBE

(75) Inventors: Jason A. Kay, Robbinsville, NJ (US); David S. Kerr, Morris Plains, NJ (US); Peter M. Mueller, Suwanee, GA (US); Ivan Pawlenko, Holland, PA (US); Larry Samson, Langhorne, PA (US)

(73) Assignee: Avaya Technology Corp., Basking Ridge, NJ (US)

( * ) Notice: Subject to any disclaimer, the term of this patent is extended or adjusted under 35 U.S.C. 154(b) by 92 days.

(21) Appl. No.: 09/628,908

(22) Filed: Jul. 31, 2000

(51) Int. Cl.⁷ ............................................. C03B 23/045
(52) U.S. Cl. ............................ 65/529; 65/109; 65/108; 65/277; 65/282
(58) Field of Search ........................ 65/109, 108, 409, 65/277, 282, 384, 419, 428, 529

(56) References Cited

U.S. PATENT DOCUMENTS

| | | | | |
|---|---|---|---|---|
| 232,625 A | * | 9/1880 | Adams | 65/108 |
| 2,060,658 A | * | 11/1936 | Brown | 65/109 |
| 3,202,495 A | * | 8/1965 | Zauner | 65/277 |
| 3,257,186 A | * | 6/1966 | Zauner | 65/104 |
| 3,293,018 A | * | 12/1966 | Doty | 264/310 |
| 3,360,352 A | * | 12/1967 | Sundstrom | 65/109 |
| 3,362,435 A | * | 1/1968 | Meyer | 138/178 |
| 3,529,322 A | * | 9/1970 | Curtis | 264/107 |
| 4,243,401 A | * | 1/1981 | Guenthner | 65/109 |
| 4,247,319 A | * | 1/1981 | Hofmann | 65/109 |
| 4,441,908 A | * | 4/1984 | Zauner | 264/296 |
| 5,079,433 A | * | 1/1992 | Smith | 250/559.24 |
| 5,095,204 A | * | 3/1992 | Novini | 250/223 B |
| 5,275,637 A | * | 1/1994 | Sato et al. | 264/1.1 |

FOREIGN PATENT DOCUMENTS

DE 2637000 A1 * 2/1978 ............... 65/109

* cited by examiner

*Primary Examiner*—John Hoffmann
(74) *Attorney, Agent, or Firm*—Birch, Stewart, Kolasch & Birch, LLP

(57) ABSTRACT

Apparatus for shaping a selected end region of a hollow cylindrical glass tube includes an internal mold placed within the selected end region for supporting the walls of the tube and controlling the shape of the internal surface of selected end region of the tube, during the period of time heat is applied to the tube and the tube is being shaped. In one embodiment the internal mold has a variable configuration and may be selectively set to an extended (open) configuration or to a collapsed (closed) configuration. With the internal mold set to its extended configuration, sufficient heat may be applied to the selected end region to render it malleable. Then, compression forces may be applied to the exterior surface of the tube to press the inner surface of the selected end region of the tube against the outer surface of the internal mold, causing the inner surface of the selected end region to conform to the outer surface of the internal mold. After the tube is shaped the internal mold may be set to its collapsed configuration and removed from the tube.

14 Claims, 8 Drawing Sheets

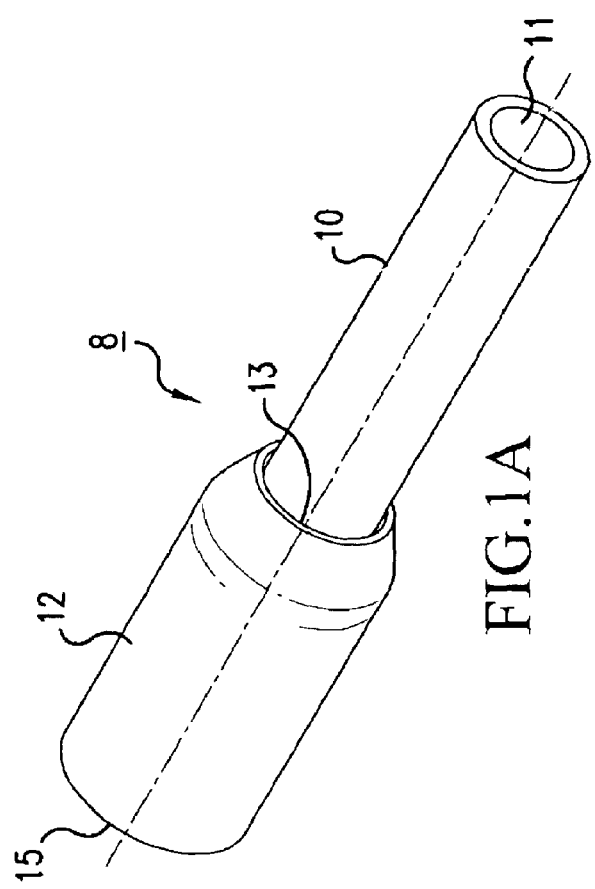
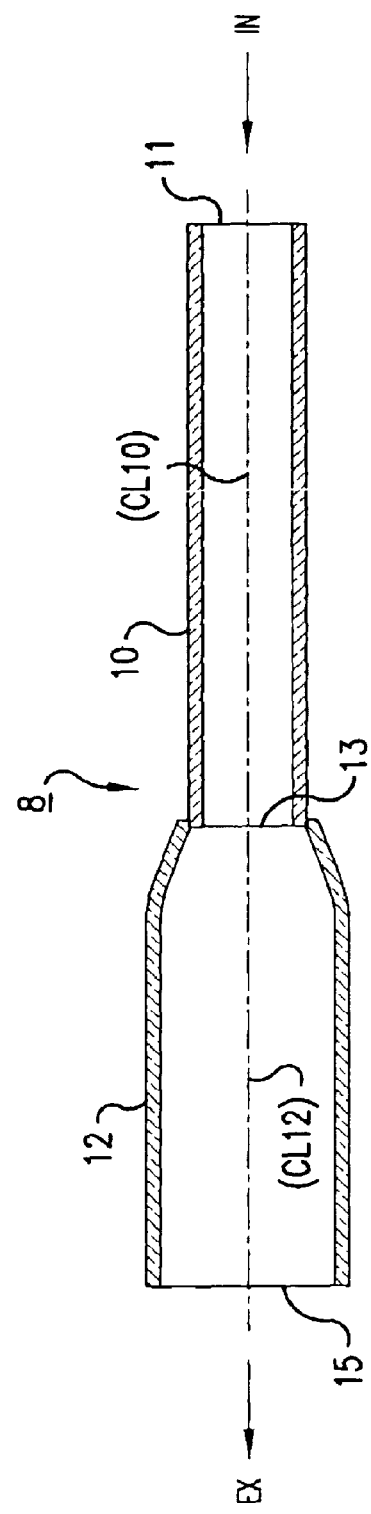
FIG.1A
FIG.1B

INTERNAL ADJUSTABLE MOLD APPARATUS FOR SHAPING THE END OF A FIBER PREFORM TUBE

BACKGROUND OF THE INVENTION

This invention relates to apparatus and methods for shaping tubes and, in particular, to shaping glass tubes intended for use in the manufacture of optic fibers and for doing so semi-automatically or automatically.

One process for the manufacture of optical fibers is referred to as the modified chemical vapor deposition (MCVD) process in which the internal wall of a glass cylinder (also referred to herein as the "starter tube" or "preform tube") is coated with uniform layers of reactants and gas vapors to form the optic fibers. To ensure the proper and uniform flow of gases within the starter tube, it is desirable to join, or fuse, the starter tube to an exhaust tube prior to initiating the actual fiber optic manufacturing process.

For optimum results the exhaust tube should provide smooth, continuous flow for the gases escaping from the starter tube to, and through, the exhaust tube. To accomplish this result, the exhaust tube must generally have a larger diameter than the starter tube. However, at their interface and mating ends the exhaust tube must mesh smoothly and continuously with the starter tube and must have a profile which aids in the smooth flow of gases out of the starter tube.

It is also noted that each exhaust tube is intended to be joined (or fused) to a starter tube and that the two "combined" tubes are then operated as a unit. Typically, the combined tubes are mounted in an apparatus in which they are made to rotate for many hours while gases and reactants are being injected into the starter tube under intense heat conditions, for forming uniform layers of optic fibers. To ensure the formation of even and uniform layers, it is important that the two tubes be aligned very accurately; (i.e., have a common center line) throughout the process.

In some presently known systems the end of an exhaust tube designed to mate with a starter tube is shaped manually using a graphite forming tool (e.g., a paddle), or like manual equipment. This process is an "art" dependent on the skills and techniques of the artisan shaping the mating end and interface of the exhaust tube. This is undesirable and problematic because tubes shaped manually have little uniformity and dimensional reproducibility. As a result, numerous defective exhaust tubes are produced. Equally problematic is that, even when an exhaust tube is not defective, the mating of an exhaust tube formed by the "paddle" method with a starter tube is subject to alignment problems since no two exhaust tubes will normally be dimensionally equal.

In other presently known methods, a mold is applied to the exterior section of a tube, a plug is inserted into the end of the tube and air is injected within the tube to support the inner cavity of the tube during molding. Some materials, especially pure silica, require a great deal of air pressure to maintain the shape of the tube when the when the tube is heated to the point that it is malleable. In addition, increasingly greater levels of air pressure must be generated as the thickness of the glass wall of the tube increases. Because the glass cools very quickly when air is injected, the forming operation must be completed before the glass becomes too cool to form. As the required air pressure level increases, it becomes more difficult to complete the forming/molding operation before the glass cools. As a consequence, the heating/molding/air injection/ forming process must be repeated until the glass is finally formed/shaped as required. This subjects the process to errors, which is unacceptable. Elimination of the need to inject air is desirable as it eliminates the need for these multiple forming operations.

SUMMARY OF THE INVENTION

Applicants' invention resides, in part, in the recognition that the prior art methods for shaping the exhaust tube are directed primarily at applying shaping forces to the exterior portions of the exhaust tube. Applicants recognized that it is equally, if not more, important to directly control the shaping of the inner surface of the exhaust tube.

Accordingly, the present invention is directed to apparatus and methods for more accurately shaping the inner surface of the end portion of an exhaust tube selected to mesh with a starter tube. This includes the placement of an internal mold, or a "tool", within the selected end section of the tube selected to be shaped. The use of an "internal" mold reduces variations when using the present paddle, or pallet, method and it eliminates the need to inject air (and an end plug) when applying external molds to shape the tube.

The invention also includes a novel tool ("mold") for shaping the desired end section of a tube. In accordance with one aspect of the invention, the tool ("mold") has a variable configuration and may be selectively set to one configuration in which it is fully open or extended, or it may be set to another configuration in which it is closed or collapsed. When the tool is in its open, or extended, configuration, it functions as a mold and it then may be used to shape the inner surface of the tube. When the tool is in its closed, or collapsed, configuration, it is easily insertable into the tube or withdrawable from within the tube.

In accordance with one aspect of the invention, a collapsible tool is inserted into the end of an exhaust tube to be shaped. The collapsible tool can assume either a fully open, (i.e., extended) configuration or a closed (i.e., collapsed) configuration. To shape a selected end of an exhaust tube, the tool may be inserted into the tube either in its open or closed configuration. However prior to shaping the tube end, the tool is set to its open, extended configuration. Thereafter, heat is supplied to the tube end until the tube is rendered malleable. When the tube is rendered malleable, the exterior of the tube may be either manually compressed by means of a paddle or a mold may be applied to the exterior of the tube pushing the inner surface of the tube against the exterior surface(s) of the extended tool. The inner surface of the tube will then generally conform to the exterior shape of the extended tool. Thus, in apparatus according to the invention, since the internal mold defines the desired internal shape, many different external shaping means may be employed and the examples of external shaping means discussed below are merely illustrative.

In accordance with another aspect of the invention, a non-collapsible, oblate, cone-like mold may be inserted via one end of the tube and positioned, within the tube, at the tube end to be shaped. The tube end to be shaped can then be heated until the tube end is malleable and the tube can then be shaped manually, or with a mold. After shaping, the mold is removed via the one end of the tube.

The proposed method of controlling the inner surface of the tube during shaping is more robust than the current paddle method and results in a more accurately dimensioned and consistently dimensioned exhaust tube. The proposed method is less labor intensive and maintenance intensive than the prior art method and will result in yield improvements and cost reductions.

BRIEF DESCRIPTION OF THE DRAWINGS

In the accompanying drawings like reference characters denote like components; and FIG. 1A is an isometric diagram of a starter tube connected to an exhaust tube shaped in accordance with the invention;

FIG. 1B is a cross sectional diagram of the exhaust and starter tubes of FIG. 1A;

DETAILED DESCRIPTION OF THE INVENTION

Figure 2:
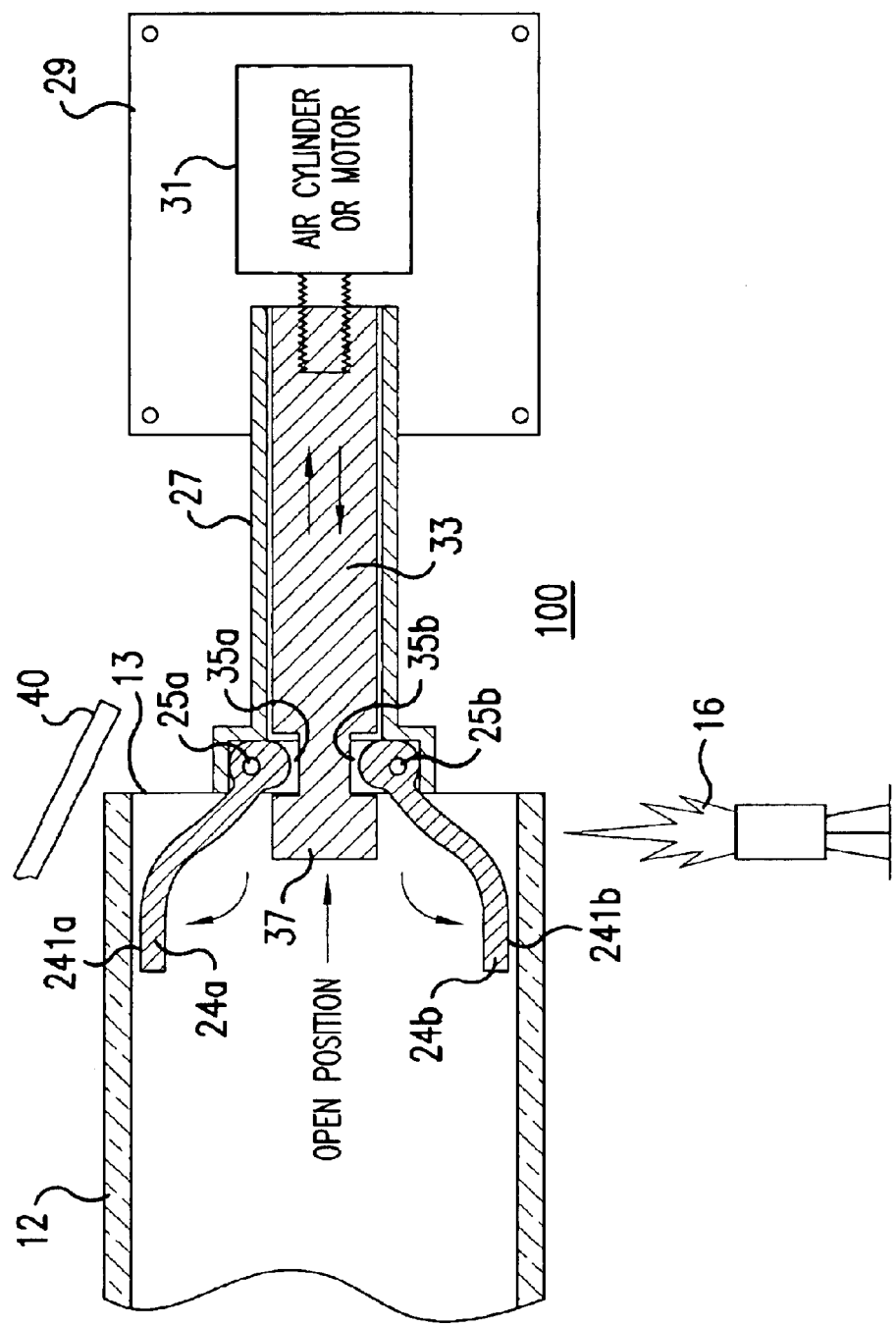
FIG. 2 is a cross sectional diagram of one end of an exhaust tube in which is mounted a tool embodying the invention.

Referring to FIGS. 1A and 1B there is shown an isometric and a cross sectional diagram, respectively, of a "preform" tube 8, where the term "preform", as used herein and in the appended claims, refers to the combined, unitary, structure of a starter tube 10 and an exhaust tube 12. The starter tube 10 is a long cylindrical glass tube in which fiber optic layers are deposited to form the fiber optic strands. The exhaust tube, 12, is also a long cylindrical glass tube having, generally, and for most of its length, a larger diameter than tube 10. Tube 12 is preferably made with a larger diameter than tube 10 so that the gases escaping EX from tube 10 into tube 12 which get deposited along the inner walls of tube 12, particularly near the interface with tube 10, do not result in a build up which would block the passage of the gases. Also, a smooth transition to an increasing diameter allows for well controlled, more uniform flow of the gases and reactants. Therefore, tube 12 is connected to the starter tube 10 to allow gases IN to escape from the starter tube in a controlled manner. When the preform 8 is used in the manufacture of optic fibers, reactants and gas vapors are introduced into the end 11 of starter tube 10. The unused gases and vapors escape from the starter tube 10 at the end 13. It is important that the "excess" gases flowing out of the starter tube 10 into the exhaust tube 12 do so with as little turbulence as possible. Reducing turbulence helps ensure that the optic fiber layers are deposited more uniformly within the starter tube. To reduce turbulence, the exhaust tube 12 is preferably designed to have a larger diameter than the starter tube and to present no sharp curves or steps at the starter/exhaust tube interface. Furthermore, it is desirable that the exhaust tube be connected to the starter tube such that its center line (c112) lies along an extension of the center line (c110) of the starter tube. This ensures that, when the preform is subsequently mounted in an apparatus to form optic fibers, the preform will rotate uniformly and evenly. The exhaust tube 12 is also designed to have a larger diameter than starter tube 10 to ensure that gases escaping from the starter tube and deposited along the inner surfaces of the exhaust tube do not unduly narrow the path for the escaping gases.

Figure 3:
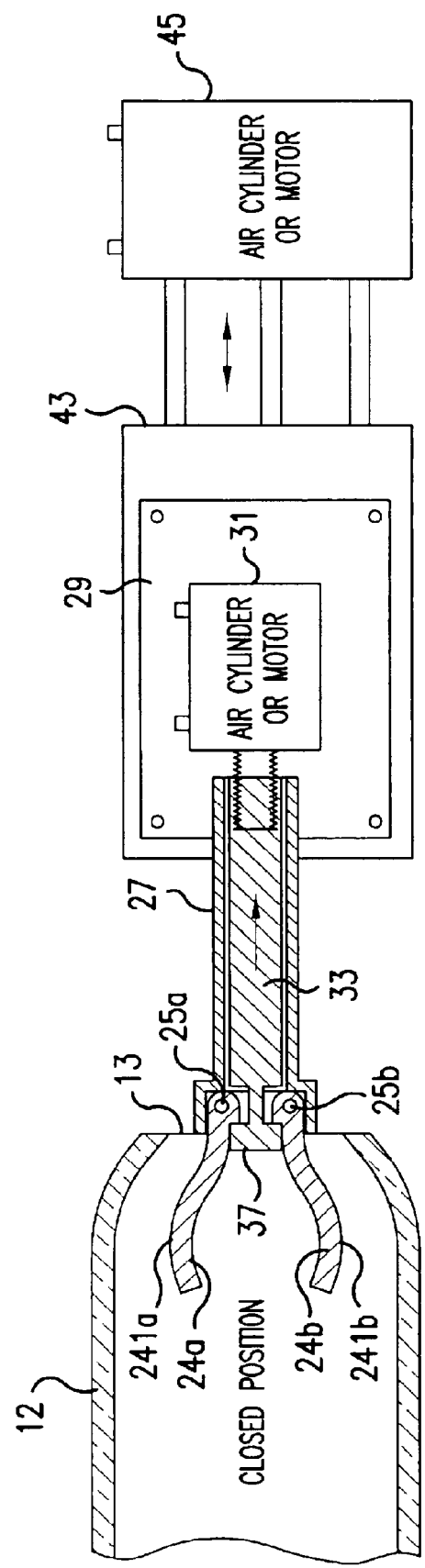
FIG. 3 is a cross sectional diagram of the shaped end of an exhaust tube in which is mounted a collapsed tool embodying the invention.

To mold the inner surface of the exhaust tube 12, a tool, or mold, 100 embodying the invention is inserted into one end of the tube, as shown in FIG. 2. The tool includes prongs 24a, 24b, pivotally mounted, via pivots 25a, 25b, on a sleeve, or handle, 27, which is fixedly connected (e.g., welded) to a mounting plate 29. An anvil 33 mounted within sleeve 27 is connected to an air cylinder 31 which controls the back and forth movement of the anvil. The anvil 33 includes pockets 35a, 35b, formed between a head portion 37 of the anvil 33 and the body of the anvil, for forcing the prongs 24a, 24b, into an extended ("open") configuration and holding them fixedly in place in the open state when the anvil is urged forward by air cylinder 31. The head 37 of anvil 33 may be positioned within the tube 12, beyond the opening 13 of the tube end. The anvil 33 and head 37 when retracted cause the prongs 24a, 24b, to be rotated downward to a collapsed position, whereby the prongs are driven to the collapsed or closed configuration. In the collapsed condition, as shown in FIG. 3, the prongs occupy (i.e., encompass) a smaller volume (cylindrical, rectangular or cubic) which enables the collapsed tool to be retracted or withdrawn easily through the narrowed tube opening 13.

Figure 4:
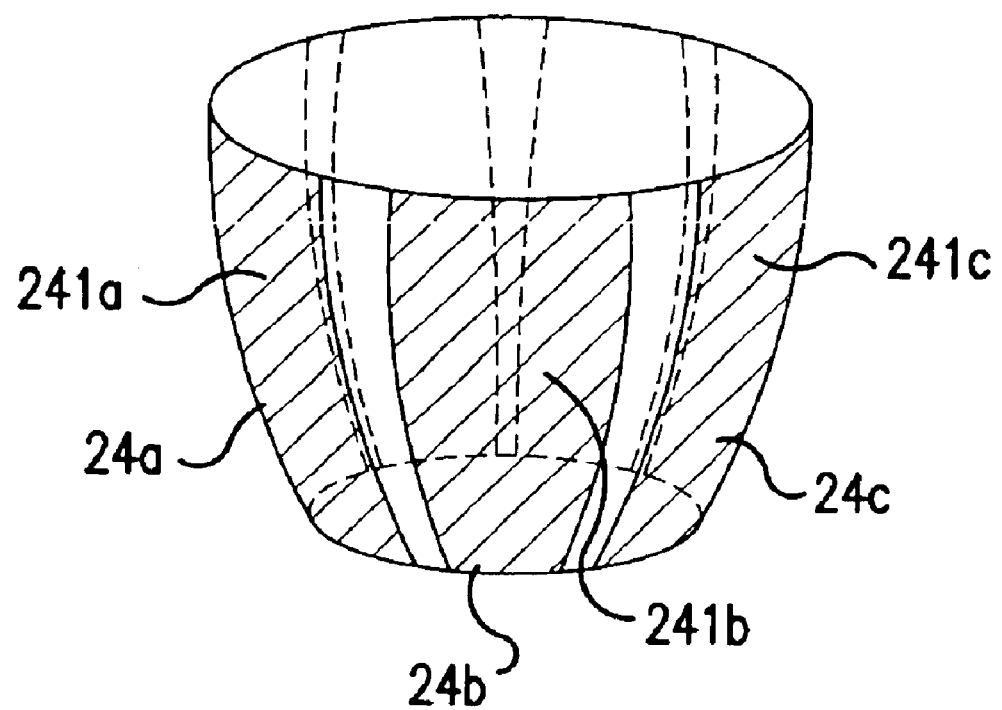
FIG. 4 is an isometric diagram of a portion of a tool embodying the invention in its extended configuration.

Thus in accordance with the invention, a tool 100 includes a molding portion (i.e., extended prongs 24a, 24b) which is inserted into the end of the exhaust tube 12 to be shaped. The tool 100 may preferably have three or more extensions (prongs or fingers 24a, 24b, 24c) which are inserted into the tube end. The prongs are mechanically attached to a handle 27 and are in a closed or collapsed configuration (as shown in FIG. 3) when withdrawn from the tube after the tube end 13 has been narrowed. The tool 100 may be activated by means of an air cylinder or a motor, as indicated in the figures, or by means of a manual spring-loaded mechanism or any other suitable means. The tool is operated such that the prongs or fingers may be extended upwardly and outwardly (as shown in FIGS. 2 and 4) so that they can open and the external surfaces of the prongs can press against (or be pressed against by) the inside surface of the exhaust tube 12, when the tube 12 is rendered malleable. The tube 12 may be rendered malleable by the application of a heat source, such as torch 16, to the tube end being shaped. After being rendered malleable, pressure may be applied to the exterior end surface of the tube 12 causing the inner surface of the selected end of tube 12 to be compressed together and the end narrowed, as shown in FIG. 3. The tool 100 may be inserted into the tube 12 while the tool 100 is in the collapsed condition. However, depending on tolerances of the various components, the tool 100 may also be inserted into the tube while the prongs are in the extended configuration.

The tool 100 should be constructed of temperature resistant materials (e.g., graphite, ceramic). The mold components may be manufactured to close tolerances from materials which can withstand the high temperatures of molten glass. Examples of appropriate materials-include cast iron or steel coated with a ceramic or other coating resistant to the high temperatures. It is important that any ceramic coating used will not contaminate the glass products being manufactured.

The prongs or fingers (e.g., 24a, 24b, 24c), which may be pivoted via pivots (e.g., 25a, 25b) from a closed to an open (extended) configuration (or vice-versa), are designed to have substantial width, such that when in the open or extended condition the prongs arranged side-by-side, as shown in FIG. 4, cover a significant portion of the inner tube circumference. The exterior surfaces (e.g., 241a, 241b) of the prongs, when opened, as shown in FIG. 4, also define the shape which it is desired to impart to the inner surface of the tube 12. The prongs in this extended condition define the cross sectional profile to be imparted to the inner tube surface. (The prongs may also be characterized as a multi-segmented spring structure with the number of segments varying from 3 to 15, or more.) Thus, the exterior surfaces 241a, 241b of the tool 100, when opened, function as an internal mold against which the inner surface of the tube 12 may be shaped using either a paddle or an external mold. That is, after the tool is inserted into the tube 12 and after the tool is set to its extended condition, the end of tube 12 being shaped may be heated by a torch 16 (See FIGS. 2 and 5A) or like heat source (See FIG. 6) until the tube 12 is rendered malleable. A paddle 40 (see FIG. 2) may then be used to shape the tube end so that the tube end is caused to become narrower with the inside surface of the tube conforming to the exterior surface of the prongs of tool 100. Alternatively, a multi-piece external mold may be applied to the exterior of the tube 12 (as shown in FIGS. 5A, 5B, 5C and 6) to shape the selected end region of tube 12 in conjunction with the interior mold 100 set to its extended condition. After the tube is shaped and cooled the tool may be returned to its collapsed condition and the prongs removed through the narrowed tube end of the tube 12.

In systems embodying the invention, it is not necessary to inject air into the tube cavity to achieve and maintain the desired tube shape. Also, it is not necessary to insert a plug into the tube end since the tool 100 serves to physically support the inside of the tube cavity and at the same time provide the proper shape against which the tube, when rendered malleable, is pressed.

FIG. 3 illustrates that, when in the closed configuration, the tool can be easily retracted through the narrowed opening of the formed tube end. Note that the tool 100 can be inserted into the tube when it is in its closed configuration. However, it should be understood that the tool 100 can also be inserted into the tube 12 while set to its open, extended condition.

FIG. 3 shows the prongs in their closed position. FIG. 3 also shows the air cylinder system 45 to retract the anvil assembly fixture on which is held the mounting plate 29 and to which is connected the air cylinder assembly 31 to control the advance and retraction of the anvil 33.

Figure 5A:
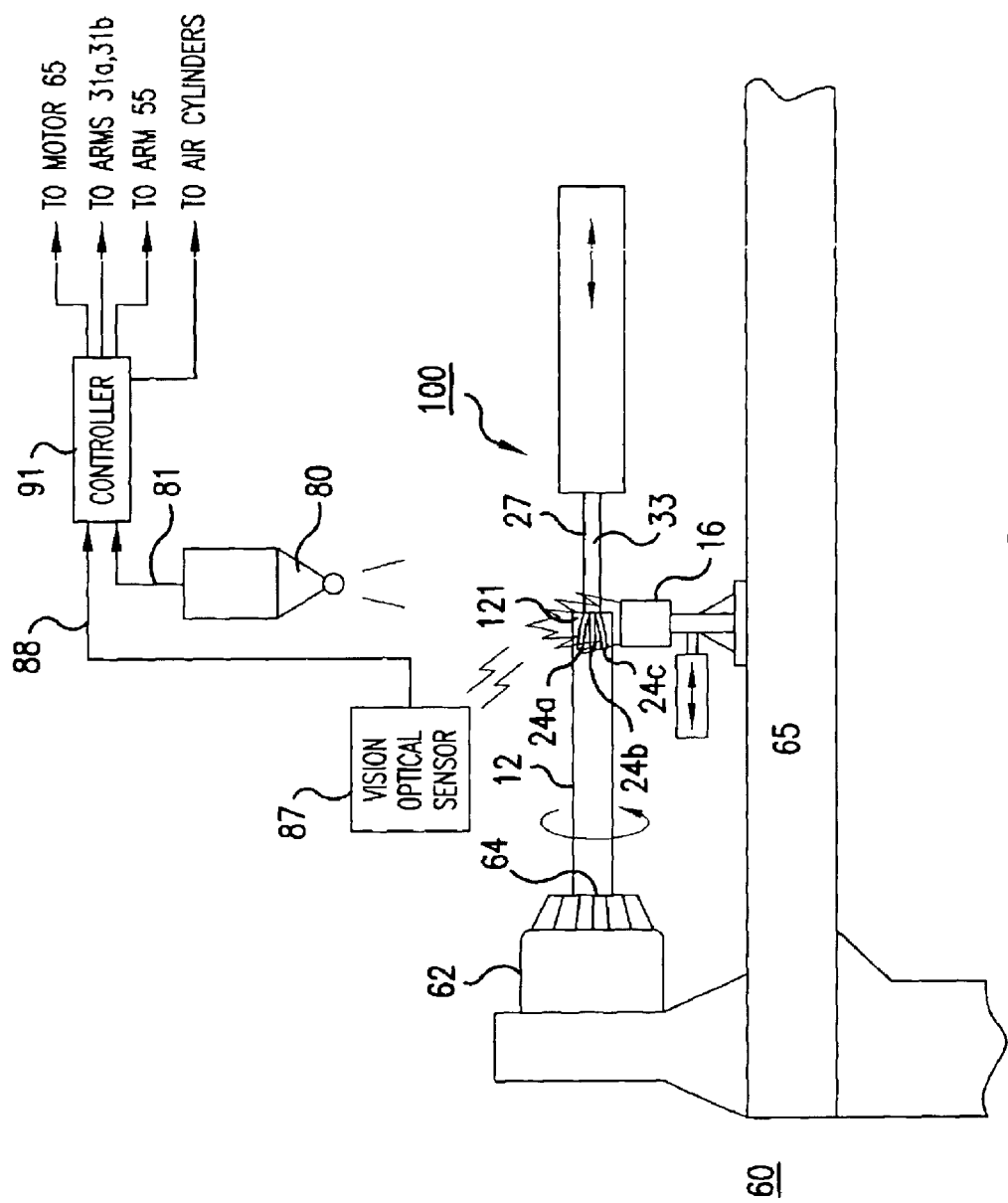
FIGS. 5A, 5B and 5C illustrate the shaping of an exhaust tube using an internal mold embodying the invention and an external mold.
Figure 6:
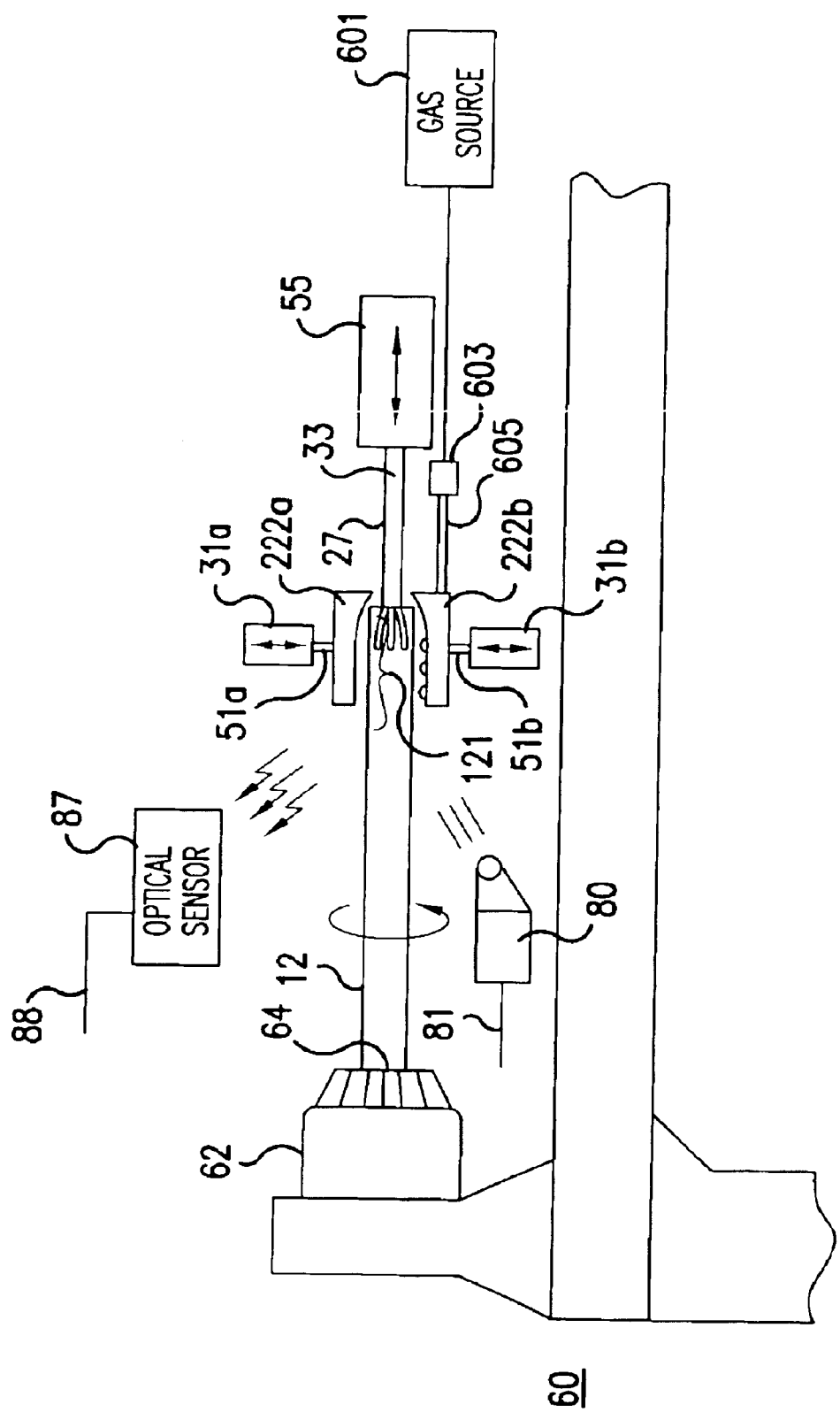
FIG. 6 illustrates another system for shaping an exhaust tube using an internal mold embodying the invention and an external mold.

As shown in FIGS. 2 and 3, prongs or fingers 24a, 24b are pivotally mounted on a sleeve 27 which is fixedly connected (e.g., welded) to a mounting plate 29. An air cylinder 31 is shown connected to an anvil 33 mounted within sleeve 27. The exterior surfaces 241a, 241b of prongs 24a, 24b, when extended, defines the shape of the surface which the inner surface is to acquire when formed. During the forming process, the tube 12 would be mounted on a lathe (See FIG. 5A or 6) to enable the tube to be rotated. The tool 100 would then be inserted into the end of the tube to be shaped. The tool 100 may be inserted in its collapsed form or in its open form. If inserted in its collapsed form, the tool 100, after being inserted, would be opened to its extended state. Heat would then be applied to the tube 12, as shown in FIG. 2, 5A or 6, to render the selected tube end malleable. When that condition is reached, a mallet or paddle (40 in FIG. 2) may be used to manually compress and press against the end of the tube 12 to cause the end of the tube to be narrowed, while the inner surface of the tube conforms closely to the exterior shape of the prongs of the tool in their extended (open) configuration.

Figure 5B:
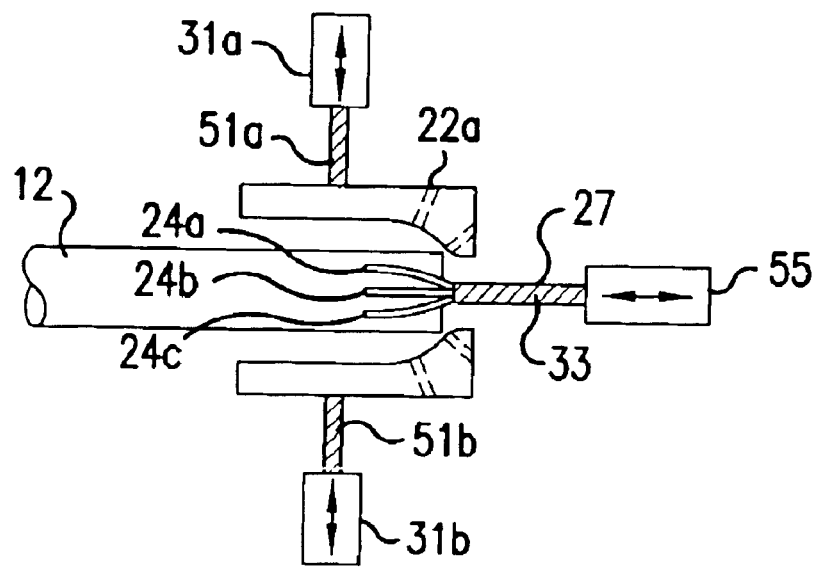
Figure 5C:
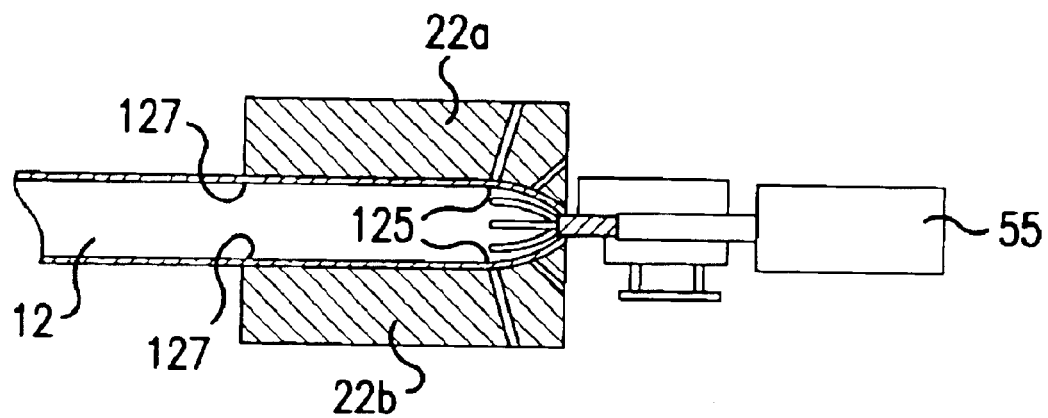

Referring to FIG. 5A, there is shown an apparatus for semi-automatically, or automatically, shaping a selected end 121 of the tube. Tube 12 is firmly positioned within a central opening 64 of a rotatable chuck 62 of a horizontally mounted controlled speed lathe 60. The lathe 60 supports tube 12 and ensures that tube 12 is rotated at a controlled speed. The internal mold 100 and prongs 24 may be inserted into the selected end of tube 12, as discussed above and as illustrated in FIGS. 2, 3 and 4. A heat source 16 is positioned such that the selected end portion, 121, of tube 12 is heated to a temperature of, for example, approximately 2,100 degrees centigrade, which causes the end of the tube to become soft and malleable. The heat source 16 may be an oxygen-hydrogen torch, but any other suitable heat source may be used. FIGS. 5B and 5C illustrate the application of an external mold assembly to a tube 12 while the internal mold 100 with prongs 24 is inserted within the tube. This arrangement enables the shaping of tube 12 in a semi-automatic manner. The temperature of the heat source applied to the tube can be measured by a pyrometer 80 having an output 81 which can be coupled to control circuitry 91 for controlling the heat supplied to the tube end, 121. The output of pyrometer 80 may also be used to control the application and retraction of the heat source, 16. The heat source 16 may be moved back and forth via a motor 65 which may be controlled by an output from pyrometer 80, or by other means such as an optical sensor 87, coupled via lines 88 to controller 91, or manually, and/or by any other independent or related means. The optical sensor 87 may be used to sense the condition of the tube and then provide a controlling signal.

When the tube segment 121 reaches the desired temperature for forming, the heat source 16 is removed and a multi-part "external" mold (22a, 22b in FIGS. 5B and 5C) is applied to the exterior surface of end section 121 of tube 12. FIG. 5B illustrates (symbolically) that the external mold sections (22a and 22b) are held by mechanical holders 51 a, 51 b and that the prongs 24 of internal mold 100 and anvil 33 are coupled to an air cylinder 55. The external mold sections 22a, 22b may have holding studs or holes located along their outer surface or along their end faces. The mechanical holders 51a, 51b are, respectively, coupled to air cylinders 30a, 30b which control the application of their respective mold portions (22a, 22b) to tube 12. That is, air cylinders 31a and 31b control the application and retraction of external mold pieces 22a and 22b. Air cylinder 55 controls the application and the condition of the internal mold prongs 24. The actuation of air cylinders 31a, 31b, determining the application and retraction of the externally applied mold pieces, and the actuation of air cylinder 55 controlling the application and retraction of mold 100, may be controlled by controller 91 in response to an output from pyrometer 80 and/or by other means such as an optical sensor (e.g., photosensor 87), or manually, and/or by any other independent or related means. The output of the optical sensor, like the output of the pyrometer, may be used to sense the condition (e.g., the malleability) of the tube in order to apply and or retract the external mold.

When the tube is heated to the point that it is rendered soft and malleable, the torch 16 may be turned off and/or moved out of the way. The two side sections 22a and 22b of the mold are applied around the periphery of tube 12, along its selected tail end portion 12, for imparting a smooth curve to the tail end of the tube. The two side pieces 22a, 22b, leave an opening at their end surrounding the sleeve 27 supporting the prongs 24. Prongs 24 are preferably inserted within the opening of tube 12, prior to the application of heat to the tube end, for shaping the inner surface of tube 12 and ensuring the proper dimensioning of the inner diameter of tube 12, as discussed above. Thus, the prongs 24, in combination with the side mold pieces, 22a,22b, impart a predetermined shape to the inner surface and to the inner rim of tube 12 and also controls the inner and outer diameters of tube 12, to enable a starter tube to "nest" and/or mate within the opening of the exhaust tube 12.

After the tube is formed and the system has stabilized, the external mold pieces 22a, 22b are retracted from the tube. Concurrently, the tool 100 and prongs 24 are withdrawn from within the tube and the exhaust tube is allowed to cool. That is, after the internal and external mold pieces have been applied for a predetermined period for shaping the exhaust tube, the molding components 22a, 22b, and 24 are retracted to allow the glass tube to cool and to then be removed from the equipment.

The apparatus of FIGS. 5A, 5B and 5C may be part of a semi-automatic or automatic system for molding and shaping a selected end of the exhaust tube to mate with the starter tube.

Thus, according to one aspect of the invention, exhaust tube 12 may be shaped semi-automatically or automatically, with a simple, closed loop, control system. This eliminates the "art" used in the prior art forming method and replaces it with a method and apparatus for forming tubes having more consistent form dimensions, with fewer defects and fewer unusable products. Consequently, the manufacture of exhaust tubes and preforms in accordance with the invention leads to increased productivity in the manufacture of optical fibers.

Thus, in accordance with the invention, glass tubes may be formed which have reproducible dimensions and consistently have the same shape resulting in a reduced number of defective products and eliminating the need for manually forming the glass tubes.

As shown in FIGS. 5B and 5C, the external mold pieces include elongated side sections 22a, 22b. The side sections 22a and 22b are applied along an end section of tube 12, extending from a point 127, past the bending point 125, and past the end 13 of tube 12. The side sections impart a smooth taper to the end section of the tube 12 and reduce its inner diameter gradually such that at a point 13, the inner diameter of tube 12 matches that of a starter tube 10, intended to be mated with tube 12. The resulting end section of tube 12 may be generally characterized as an oblate cone like section. The prongs 24 inserted into the orifice at the selected end of hollow cylindrical tube 12 shape the inner rim of the tube end and prevent the inner diameter of the tube 12 from decreasing below a predetermined value. The portion of tube 12 squeezed between the inner surfaces of mold pieces 22a, 22b and the outer surfaces of the prongs 24i results in tube 12 assuming a desired shape. The application of the external mold pieces, 22a, 22b, together with internal mold pieces 24, to a selected end of tube 12, after it has been rendered malleable, causes tube 12 to assume the desired form.

FIG. 5B also shows that the two side pieces of the mold, 22a and 22b, are held by mechanical holding arms 51a, 51b, which may be selectively activated by air cylinders 31 a, 31 b, to cause the application and/or retraction of the side molds 22a, 22b to, or from, the cylindrical tube 12. The two side pieces of the mold may originally be part of a unitary sleeve-like structure which is cut (sawed) in half (or in a different ratio) to produce the two halves 22a, 22b. The outer periphery of the two side pieces may include studs or holding holes or posts to enable holding arms 51a, 51b to securely hold and apply their respective mold section.

FIG. 5C is a simplified cross sectional diagram showing the general shape of tube 12 after the external mold pieces 22a, 22b have closed-in on the tube. The side pieces, 22a and 22b,extend along the length of cylindrical tube 12 and impart a smooth taper along the length of the tube beginning at a point 125 and continuing to the end 13 of the tube. When joined together, the inner surfaces of side pieces 22a, 22b define an oblate cone-like shape. In their application, the side pieces extend from a point 127 along the tube 12 to the end 13 of the tube to complete shaping the end of tube 12. The prongs 24 ensure that the shape of the inner surface and the opening 13 at the mating end of tube 12 are as desired.

The opening of tube 12 needs to be sufficiently large to ensure that the inner diameter of the "shrunken" exhaust tube at point 13 is approximately equal to the inner diameter of starter tube 10 while the outer diameter of tube 12 between lines 13 and 14 is just a little larger than the outer diameter of starter tube 10. This enables the starter tube to be easily mated into the opening of tube 12.

FIG. 6 illustrates that the system of FIG. 5A may be modified such that at least one of the mold pieces 22b contains a heat source (gas source 601 connected to gas fitting 603 connected to gas tubing 605 connected to mold 222b) for applying heat to the tube end. The external mold 222a, 222b in FIG. 6 contain a heat source and also function to shape the external portion of the tube and to compress end portion 121 of the tube 12 so that its inner surface conforms to the exterior surface of extended prongs 24.

Although a particular embodiment has been described, it is to be understood that the present disclosure is only by way of illustration and that numerous changes in the shape of the tubes and in the construction of the molds may be made without departing from the spirit and scope of this invention. Thus, an important aspect of the invention is that a first internal mold 100, including prongs 24, is used to shape the inner surface of the tube 12. Applicants recognized that controlling the shaping of the inner surface of tube 12 is most important to produce the required predetermined form. In the system of FIGS. 2, 3, 4, 5 and 6, in order to withdraw the inner mold 100 after the tube is shaped (and its opening narrowed) the inner mold (prongs 24) must be collapsed and the volume of the prongs must be reduced to enable the mold to be extracted from the narrowed end of the tube.

However, when tolerances of the inner diameter of the tube 12 permit, it may be possible to push (or pull) the internal mold through the opposite (non-narrowed) end of the exhaust tube 12 and eliminate the need to collapse the mold for extraction. To accomplish this, internal mold 100 would have to be made so it can be detached from anvil 33 or sleeve 27.

Figure 7:
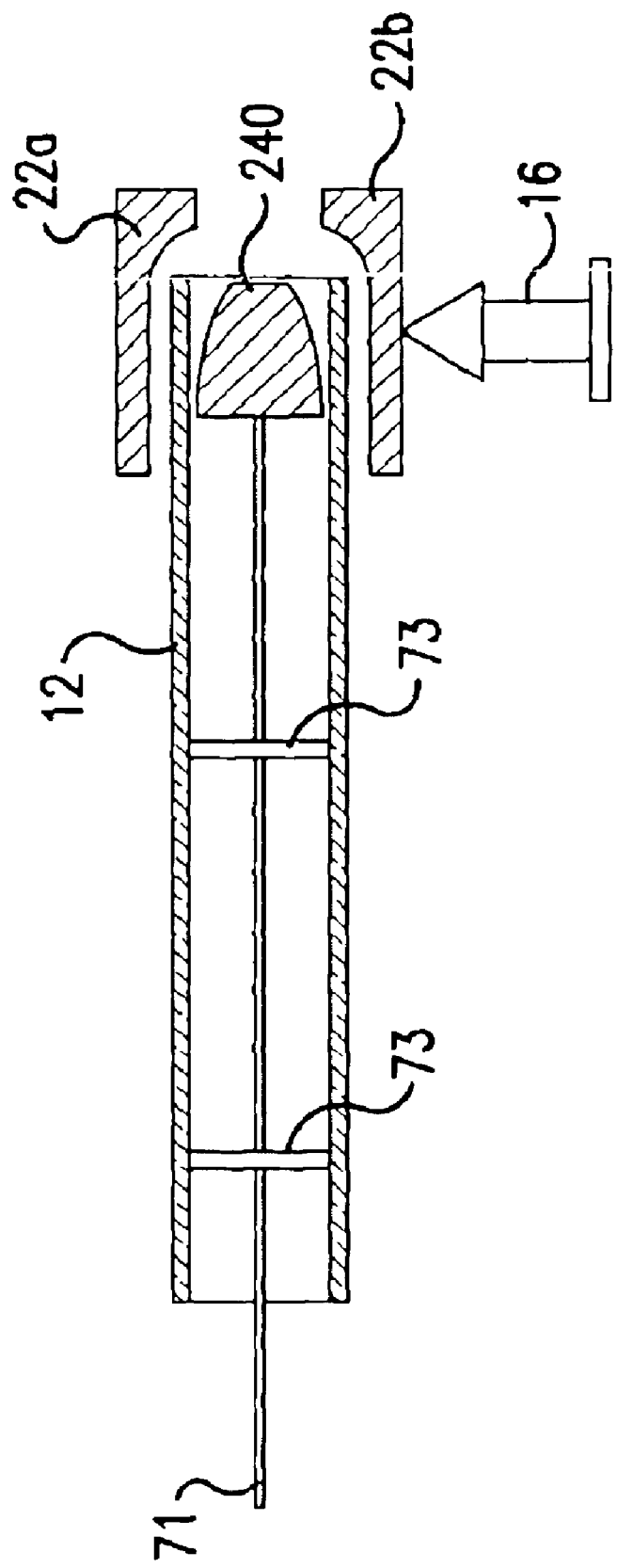
FIG. 7 is a cross-section of an exhaust tube with a non-collapsible internal mold.

Alternatively, when the tolerances permit, it may be appropriate to construct a fixed, preshaped, internal mold 240 and mount it on a rod or shaft 71 which can extend the length of the exhaust tube, as shown in FIG. 7. The rod 71 may be supported by one or more shims 73 for holding the rod 71 steady within the tube during insertion, extraction and shaping of the selected tube end. The mold may be inserted from either end of the tube. The tube may be shaped by applying heat to the selected tube end via torch 16 and, when the tube end is softened, applying an external mold (e.g., 22a, 22b) or manually working the tube. Then, after the inner surface of the selected tube end is shaped to conform to the outer surface of the internal mold 240, it may be withdrawn from the non-narrowed end of the tube 12, after the tube is shaped.

Certain mold configurations have been shown, but it should be understood that many variations and modifications may be made without departing from the spirit and scope of the inventive aspects of the molds to shape tubes.

What is claimed is:

1. An apparatus for shaping a selected end region of a hollow cylindrical glass tube used in the manufacture of optic fibers comprising:

a support device for holding the tube at a second region other than the selected end region for rotating the tube in a controlled manner;

an internal mold for shaping an inner surface of the selected end region of the tube, said internal mold being selectively operable and collapsible between an open and extended configuration and a closed and collapsed configuration;

an insertion device for inserting said internal mold within said selected end region of the tube and for setting the internal mold in its extended configuration;

a heat source supplying heat to the selected end region of the tube to render the tube malleable;

an external mold for compressing the exterior surface of the selected end region of the tube when rendered malleable, and for concurrently causing the shape of an inner surface of the tube to conform to the exterior surface of the internal mold; wherein said external mold includes a pair of side pieces for imparting an oblate, cone-like shape to inner and outer diameters of the tube along the selected end region while leaving an opening between the side pieces for enabling a withdrawal of the external mold when set to the collapsed configuration;

a mechanically actuated holding device for supporting the external mold; and a temperature sensing device for sensing the temperature of the selected end region of the tube.

2. The apparatus as claimed in claim 1, wherein the temperature sensing device is a pyrometer producing an actuating signal coupled to the mechanically actuated holding device when the temperature of the selected end portion is such that the end portion is in a malleable state.

3. The apparatus as claimed in claim 2, wherein the heat source is a torch and wherein said actuating signal produces a signal for removing the torch when the exterior mold is applied to the selected end portion of the tube.

4. The apparatus as claimed in claim 3, wherein said temperature sensing device controls the intensity of the heat source being applied to the selected end portion of the tube.

5. The apparatus as claimed in claim 1, further comprising an optical sensing device for sensing a physical condition of the tube.

6. The apparatus as claimed in claim 1, further comprising an activation device for setting the internal mold to its extended configuration, and for setting the internal mold to its collapsed configuration for withdrawing the mold from the tube through an opening in the selected end region, wherein said activation device includes an air cylinder, a spring-loaded mechanism, or a motor.

7. The apparatus as claimed in claim 1, wherein said mechanically actuated holding device selectively applies the exterior mold to an outer periphery of the selected end region of the tube when the tube is rendered malleable, and said internal mold cooperatively supports an inner wall of the tube and controls the shape of an inner diameter of the tube.

8. The apparatus as claimed in claim 7, wherein the tube is a first tube and wherein the variable configuration mold and the exterior mold shape the opening of the first tube to enable a second tube to be inserted within the first tube and permit the alignment of the first and second tubes along a common center line.

9. The apparatus as claimed in claim 1, wherein said support device is a lathe.

10. A method for shaping a selected end of a hollow cylindrical tube comprising the steps of:

positioning the tube within a support device and rotating the tube;

inserting an internal mold within the selected end region of the tube to support the tube end when the tube is being shaped and for controlling the shape of an inner surface of the tube end, wherein the internal mold is operatively collapsible between an extended and open configuration and a collapsed and closed configuration;

heating the selected end of the tube with a heat source until the selected end becomes malleable;

controlling the heating step with an optical sensor sensing a physical condition of the tube or with an output from a pyrometer;

compressing the exterior surface of the selected end region of the tube for concurrently shaping the exterior and inner surfaces of the selected end region of the tube into a predetermined form, wherein the exterior surface of the selected end region is compressed with at least one of an exterior mold and a paddle.

11. The method as claimed in claim 10, wherein the step of inserting the internal mold includes a step of setting the internal mold to its open configuration before and during a period in which heat is applied to the selected end of the tube.

12. The method as claimed in claim 11, wherein the step of compressing the exterior surface of the selected end region of the tube for concurrently shaping the exterior and inner surfaces of the selected end region of the tube includes a step of applying the external mold to the selected end of the tube when the selected end becomes malleable.

13. A method for shaping an opening and an end region at a selected end of a cylindrical tube comprising the steps of:

holding a portion of the tube other than the selected end, and rotating the tube;

inserting an internal mold into the selected end of the tube for supporting the end of the tube and for shaping the inner surface of the tube;

applying a heat source to the selected end of the tube until the selected end becomes malleable;

sensing the temperature of the selected end of the tube; and applying an exterior mold to the outer periphery of the tube along the selected end in response to sensing a certain temperature for tapering the selected end of the tube and gradually reducing the inner diameter of the tube from a second value to a first value.

14. The method as claimed in claim 13, wherein said internal mold is a mold having a selectively alterable shape.

* * * * *